United States Patent
Klang et al.

(10) Patent No.: US 7,192,688 B2
(45) Date of Patent: Mar. 20, 2007

(54) POLYBUTADIENE (METH)ACRYLATE COMPOSITION AND METHOD

(75) Inventors: Jeffrey A. Klang, West Chester, PA (US); Yuhong He, East Fallowfield, PA (US); Gary W. Ceska, Exton, PA (US); James P. Horgan, West Chester, PA (US)

(73) Assignee: Sartomer Technology, Inc., Wilmington, DE (US)

( * ) Notice: Subject to any disclaimer, the term of this patent is extended or adjusted under 35 U.S.C. 154(b) by 0 days.

(21) Appl. No.: 10/938,221

(22) Filed: Sep. 10, 2004

(65) Prior Publication Data

US 2005/0054798 A1    Mar. 10, 2005

Related U.S. Application Data

(60) Provisional application No. 60/502,114, filed on Sep. 10, 2003.

(51) Int. Cl.
*G03C 1/73* (2006.01)
*G03F 7/038* (2006.01)
*G03F 7/20* (2006.01)

(52) U.S. Cl. .................. 430/270.1; 430/9; 430/288.1; 430/286.1; 430/287.1; 430/905; 430/910; 430/300; 430/320; 430/321; 430/311; 526/329.1

(58) Field of Classification Search .............. 430/9, 430/270.1, 905, 910, 286.1, 287.1
See application file for complete search history.

(56) References Cited

U.S. PATENT DOCUMENTS

| | | | |
|---|---|---|---|
| 3,806,490 A * | 4/1974 | Kajiura et al. | 523/523 |
| 4,031,066 A | 6/1977 | Mori et al. | |
| 4,192,684 A * | 3/1980 | Gensho et al. | 430/284.1 |
| 4,587,201 A | 5/1986 | Morikawa et al. | |
| 5,587,433 A | 12/1996 | Boeckeler | |

FOREIGN PATENT DOCUMENTS

| | | |
|---|---|---|
| JP | 2002-371101 | 12/2002 |
| JP | 2002 371205 | 12/2002 |
| JP | 2002-371205 | * 12/2002 |
| JP | 2003 160746 | 6/2003 |
| WO | WO 97/21735 | 6/1997 |
| WO | WO 03/010209 | 2/2003 |

OTHER PUBLICATIONS

English abstract for JP 2002-371205 (Shindo et al), provided by JPO.*
Full, formal English translation of JP 2002-371205 (Shindo et al), provided by PTO.*

* cited by examiner

*Primary Examiner*—Sin Lee
(74) *Attorney, Agent, or Firm*—Cozen O'Connor, P.C.; Michael B. Fein, Esq.

(57) ABSTRACT

A composition comprising a polymer according to Structure 1

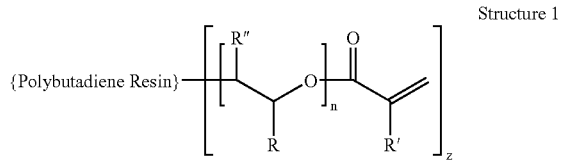

wherein R is H, Me, Et or $C_6H_5$; R' is H or Me; R" is H or Me; n=1 to 100; and Z=1 to 3, is disclosed. The composition can be cured and used in a wide range of articles such as a photopolymer printing plate, sealant, caulk, encapsulent, road marking paint, photoresist, binder, impact modifier, polymer modifier, oxygen or water vapor barrier coating, conformal coating, solder mask, pigment dispersion, stereolithograph, laminating resin, grafted co-polymer, composite, optical fiber coating, paper coating, metal coating, glass coating, plastic coating, wood coating, waterproofing material, electrical insulating material, automotive belt or hose, tire, engine mount, gasket, golf ball core, and rubber roll.

19 Claims, No Drawings

POLYBUTADIENE (METH)ACRYLATE COMPOSITION AND METHOD

CROSS-REFERENCE TO RELATED APPLICATIONS

Benefit of U.S. Provisional Application Ser. No. 60/502,114 filed Sep. 10, 2003, is claimed.

BACKGROUND OF THE INVENTION

This invention relates to polybutadiene (meth)acrylates, and compositions comprising such polymers, methods of preparation, and methods of use.

Polybutadiene (meth)acrylates are well known articles of commerce. Examples include CN301, CN302 and CN303 from Sartomer Company. These products are used in radiation or peroxide cured inks, coatings, adhesives, printing plates and other applications. Beneficial properties imparted by these materials include high flexibility, low Tg, hydrophobicity, chemical resistance and adhesion to substrates. One drawback of these products is that they have limited stability with respect to premature crosslinking or gellation which has limited their use. In addition, the hydroxy terminated polybutadiene resin, these products are based on, have terminal allylic alcohol groups that are unstable under the conditions that are typically used to prepare (meth)acrylate esters. Urethane (meth)acrylates based on hydroxyl terminated polybutadiene with alkylene oxide derived terminal hydroxyl groups have been described (U.S. Pat. No. 4,587,201; U.S. Pat. No. 4,031,066; Japanese Unexamined Patent 2002-371101, and references cited therein).

SUMMARY OF THE INVENTION

We have discovered that (meth)acrylates with average functionality Z from 1 to 3 and more particularly multifunctional methacrylates with average functionality from 1.5 to 3, derived from hydroxyl terminated polybutadiene resins in which the terminal hydroxyl functionality is derived from an alkylene oxide, according to the definition of formula (I), have good in process stability and make products that are resistant to premature crosslinking or gellation. Such polybutadiene (meth)acrylates have not been previously described.

In one aspect, the invention relates to a methacrylated polymer and to a composition comprising the said polymer defined according the general formula of the following Structure 1:

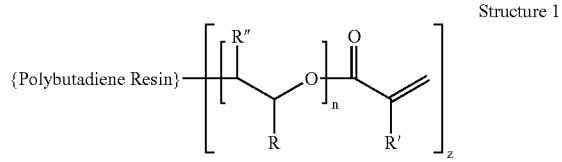

Structure 1 wherein
R is H, Me, Et or $C_6H_5$,
R' is H or Me,
R" is H or Me,
n=1 to 100 and
Z=1 to 3.

The materials of the current invention will find use in coatings, inks or adhesives cured by UV or EB radiations, peroxides or Michael addition. Specific end uses include, but are not limited to; photopolymer printing plates, sealants, caulks, encapsulents, road marking paint, photoresists, binders, impact modifiers, polymer modification, oxygen or water vapor barrier coatings, conformal coatings, solder masks, pigment dispersion, stereolithography, laminating resins, grafted co-polymers, composites, optical fiber coatings, paper coatings, metal coatings, glass coatings, plastic coatings, wood coatings, waterproofing materials, electrical insulating materials, automotive belts or hoses, tires, engine mounts, gaskets, golf ball cores and rubber rolls.

The alkylene oxide used to generate the terminal hydroxyl groups can be selected from any of those known in the prior art. Preferred examples include ethylene oxide, propylene oxide, butylene oxide and styrene oxide and mixtures thereof. Most preferred are ethylene oxide and propylene oxide or mixtures thereof. The number of alkylene oxide units can range from 1 to about 100 per reactive hydroxyl group. A preferred range is from 1 to about 30.

The polybutadiene resin can be of any molecular weight and its microstructure is not critical to the invention. Molecular weights in the range of 500 to 10,000 Daltons are preferred. For polybutadiene resins, microstructure refers to the amounts 1,2- vs. 1,4-addition and the ratio of cis to trans double bonds in the 1,4-addition portion. The amount of 1,2-addition is often referred to as vinyl content. The vinyl content of the polybutadiene can range from about 5% to about 90%. The ratio of cis to trans double bonds can range from about 1:10 to about 10:1. The average number of reactive terminal hydroxyl groups per molecule can range from about 1 to 3. A preferred range is from about 1.5 to 3 and more preferably 1.5 to 2.5.

The polymer according to the invention is prepared by a process comprising the reaction of a hydroxyl terminated polybutadiene and an alkylene oxide. The alkylene oxide can be incorporated into the polybutadiene resin by either an "in situ" procedure or in a secondary reaction step between an isolated polybutadiene resin and an alkylene oxide. The in-situ procedure would be used in the case where the polybutadiene resin is made by a process comprising anionic polymerization with the alkylene oxide being added in-situ to the active polymerization mixture, to form hydroxyl end groups. In the case where the alkylene oxide is added in a secondary reaction step, the polybutadiene resin could be made by anionic or free radical polymerization. The alkylene oxide could be incorporated by any of the methods known in the art for effecting alkoxylation of alcohols, diols or polyhydroxylic materials.

The polybutadiene(meth)acrylate esters of the invention can be formed by transesterification, direct esterification or by reaction with (meth)acrylic halides or anhydrides. Transesterification and direct esterification are the preferred industrial methods. More particularly in the case of transesterification, the process of preparing the final polymer of the invention comprises a transesterification reaction between the corresponding hydroxyl terminated alkoxylated polybutadiene resin and a low molecular weight (meth)acrylate ester, which can be preferably selected from: methyl (meth)acrylate, ethyl (meth)acrylate, n-butyl or isobutyl or tertiobutyl (meth)acrylate. In such a case the transesterification reaction is preferably catalysed by at least a catalyst selected from: metal alkoxides, metal oxides, Lewis acids or other catalysts or combinations, known in the art to catalyze transesterification reactions. A second option in preparing the said final polymer of the invention can comprise a direct esterification reaction of the corresponding hydroxyl terminated alkoxylated polybutadiene with acrylic or methacrylic acid, halide or anhydride. In direct esterification with acrylic or methacrylic acid, esterification catalysts can be used selected from sulfuric acid, p-toluenesulfonic acid methanesulfonic acid, or other strong mineral or organic acids known in the art to catalyze esterification reactions.

The compositions comprising the said polymer according to the present invention are curable by UV or EB radiations or peroxides or by Michael addition process and are suitable for coatings, inks or adhesives curable by such a process. Additional subjects of the invention relate to cured compositions resulting from these compositions and to articles comprising the said cured composition.

The compositions according to the invention are suitable for more specific uses in relation with preparing finished products or articles selected from: a photopolymer printing plate, sealant, caulk, encapsulent, road marking paint, photoresist, binder, impact modifier, polymer modifier, oxygen or water vapor barrier coating, conformal coating, solder mask, pigment dispersion, stereolithography, laminating resin, grafted co-polymer, composite, optical fiber coating, paper coating, metal coating, glass coating, plastic coating, wood coating, waterproofing material, electrical insulating material, automotive belt or hose, tire, engine mount, gasket, golf ball core, and rubber roll.

The following non-limiting examples illustrate certain embodiments of the invention.

EXAMPLES

Example 1

A 1 liter multi-neck round bottom flask fitted with a mechanical agitator, thermocouple, air sparge tube and Dean-Stark trap was charged with heptane (157 gm), acrylic acid (43 gm), methanesulfonic acid (3.2 gm), hydroquinone monomethyl ether (1.9 gm) and a hydroxyl terminated polybutadiene resin (424 gm), with hydroxyl groups derived from ethylene oxide (degree of alkoxylation=2) (2 ethylene oxide units per hydroxyl), having hydroxyl number of 50 mg KOH/gm and a calculated number average molecular weight Mn of 2244, commercially available from Sartomer Company as Krasol LBHP 2000. The mixture was heated to reflux to remove water of reaction and reflux was maintained until water production stopped. After removal of the strong acid catalyst, solvent and excess acrylic the final product was obtained as a viscous light brown liquid with properties as shown in Table 1.

Example 2

A 1 liter multi-neck round bottom flask equipped as in Example 1 was charged with heptane (315 gm), acrylic acid (28.7 gm), methanesulfonic acid (9.5 gm), hydroquinone monomethyl ether (1.9 gm) and a hydroxyl terminated polybutadiene resin (274 gm), with hydroxyl groups derived from propylene oxide with 2 propylene oxide units per hydroxyl (degree of alkoxylation=2), having hydroxyl number of 51 mg KOH/gm and a calculated number average molecular weight Mn of 2000, commercially available from Sartomer Company as Krason LBH 2000. The mixture was heated to reflux to remove water of reaction and reflux was maintained until water production stopped. After removal of the strong acid catalyst, solvent and excess acrylic the final product was obtained as a viscous light brown liquid with properties as shown in Table 1.

Example 3

A 1 liter multi-neck round bottom flask equipped as in Example 1 was charged with heptane (150 gm), toluene (150 gm), acrylic acid (24.2 gm), methanesulfonic acid (6.1 gm), hydroquinone monomethyl ether (0.3 gm) and a hydroxyl terminated polybutadiene resin (270.4 gm) derived from a base polybutadiene with number average molecular weight of about 2000 which was post—reacted with 10 moles of propylene oxide (hydroxyl number of 43.5 mg KOH/gm). The mixture was heated to reflux to remove water of reaction and reflux was maintained until water production stopped. After removal of the strong acid catalyst, solvent and excess acrylic, the final product was obtained as a viscous light brown liquid with properties as shown in Table 1.

Comparative Example 1

A 1 liter multi-neck round bottom flask equipped as in Example 1 was charged with heptane (189 gm), acrylic acid (41.7 gm), methanesulfonic acid (9.5 gm), hydroquinone monomethyl ether (1.9 gm) and a hydroxyl terminated polybutadiene resin (387 gm) with allylic terminal hydroxyl groups having hydroxyl number of 47 mg KOH/gm (PolyBD R45HTLO from Sartomer). The mixture was heated to reflux to remove water of reaction and reflux was maintained until water production stopped. After removal of the strong acid catalyst, solvent and excess acrylic the final product was obtained as a dark brown semi-gel that could not be further characterized.

Comparative Example 2

A 1 liter multi-neck round bottom flask equipped as in Example 1 was charged with heptane (162 gm), acrylic acid (65.8 gm), methanesulfonic acid (9.5 gm), hydroquinone monomethyl ether (2.0 gm) and a hydroxyl terminated polybutadiene resin (415.9 gm) with terminal allylic hydroxyl groups having hydroxyl number of 103 mg KOH/gm (PolyBD R20LM from Sartomer). The mixture was heated to reflux to remove water of reaction and reflux was maintained until water production stopped. After removal of the strong acid catalyst, solvent and excess acrylic the final product was obtained as a viscous dark brown liquid with properties as shown in Table I.

TABLE I

|  | Example 1 | Example 2 | Comparative Example 1 | Comparative Example 2 |
| --- | --- | --- | --- | --- |
| Color | 70 APHA | 150 APHA | Very dark | Very dark |
| Brookfield viscosity, mPa · s (cPs) @ 25° C. | 5600 | 11,100 | Semi gelled | 54,500 |
| Mn | 2700 | 2500 | 4700 | 2600 |
| Mw | 3200 | 3200 | 247,000 | 40,000 |
| Stability @ 80° C. | >30 days | >30 days | na | <1 day |

While the invention has been described and illustrated in great detail, various other embodiments, alternatives, and substitutions should become readily apparent to those skilled in this art without departing from the spirit and scope of the invention.

What is claimed is:

1. A composition comprising a polymer according to Structure 1

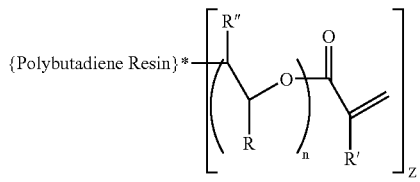

wherein
R is H, Me, Et or $C_{6H5}$,
R' is H or Me,
R" is H or Me,
n=1 to 100 and
Z=1 to 3.

2. The composition of claim 1 wherein n=1 to 30.

3. The composition of claim 1 wherein Z=1.5 to 3.

4. The composition according to claim 1 wherein the number average molecular weight of the polymer is from 500 to 10,000 Daltons.

5. The composition of claim 1 wherein the polymer is prepared by a process comprising the reaction of a hydroxl terminated polybutadiene and an alkylene oxide.

6. The composition of claim 5 wherein the alkylene oxide is selected from the group consisting of ethylene oxide, propylene oxide, 1,2-butylene oxide, 2,3-butylene oxide, styrene oxide, and mixtures thereof.

7. The composition of claim 1 wherein the said polymer is prepared by a process comprising a transesterification reaction between a hydroxyl terminated polybutadiene resin and a low molecular weight (meth)acrylate ester.

8. The composition of claim 7 where the said low molecular weight (meth)acrylate ester is selected from methyl (meth)acrylate, ethyl(meth)acrylate, n- or iso-propyl(meth)acrylate, or n-, iso-, or tert-butyl(meth)acrylate.

9. The composition of claim 7 wherein the said transesterification reaction is catalyzed by a metal alkoxide, metal oxide, Lewis acid, or other catysts or combinations known in the art to catalyze transesterification reactions.

10. The composition of claim 1 wherein the said polymer is prepared by a process comprising a direct esterification reaction of the corresponding hydroxylated alkoxylated polymer with acrylic or methacrylic acid.

11. The composition of claim 10 wherein the said direct esterification reaction is catalyzed by sulfuric acid, para-toluenesulfonic acid, methanesulfonic acid, or other strong mineral or organic acids known to catalyze esterification reactions.

12. The composition of claim 1 wherein the said polymer is prepared by a process comprising an anionic polymerization with the alkylene oxide being added "in-situ" to the active polymerization, to form hydroxyl end groups.

13. The composition of claim 11 wherein the said polymer is alkoxylated with an alkylene oxide, with a degree of alkoxylation n defined according to claim 1.

14. A method comprising curing a composition of claim 1.

15. The method of claim 14 wherein the composition is radiation cured using UV or EB radiation, or is cured with peroxides Michael addition.

16. A coating, ink, or adhesive prepared by the method of claim 14.

17. A photopolymer printing plate, sealant, caulk, encapsulent, road marking paint, photoresist, binder, impact modifier, polymer modifier, oxygen or water vapor barrier coating, conformal coating, solder mask, pigment dispersion, stereolithography, laminating resin, grafted co-polymer, composite, optical fiber coating, paper coating, metal coating, glass coating, plastic coating, wood coating, waterproofing material, electrical insulating material, automotive belt or hose, tire, engine mount, gasket, golf ball core, or rubber roll prepared by the method of claim 14.

18. An article comprising a cured composition prepared by the method of claim 14.

19. The article of claim 18 in the form of a photopolymer printing plate, sealant, caulk, encapsulent, road marking paint, photoresist, binder, impact modifier, polymer modifier, oxygen or water vapor barrier coating, conformal coating, solder mask, pigment dispersion, stereolithograph, laminating resin, grafted co-polymer, composite, optical fiber coating, paper coating, metal coating, glass coating, plastic coating, wood coating, waterproofing material, electrical insulating material, automotive belt or hose, tire, engine mount, gasket, golf ball core, and rubber roll.

* * * * *